United States Patent [19]

Henker

[11] 3,744,902

[45] July 10, 1973

[54] DEVICE FOR PRODUCING A PHOTO-VARNISH MASK

[75] Inventor: Heinz Henker, Munich, Germany

[73] Assignee: Siemens Aktiengesellschaft, Berlin, Germany

[22] Filed: July 14, 1971

[21] Appl. No.: 162,685

Related U.S. Application Data

[63] Continuation of Ser. No. 769,856, Oct. 23, 1968, abandoned.

[30] Foreign Application Priority Data

Oct. 23, 1968 Germany .................. P 11 26 212.1

[52] U.S. Cl. ................ 355/53, 33/1 M, 33/174 TA, 83/412, 269/58, 408/91

[51] Int. Cl. ............................................ G03b 27/42

[58] Field of Search ............ 355/53; 33/1 M, 180 R, 33/174 TA; 408/91; 83/412; 269/58

[56] References Cited

UNITED STATES PATENTS

| | | | |
|---|---|---|---|
| 3,232,141 | 2/1966 | Swanson | 408/91 X |
| 2,466,322 | 4/1949 | Merritt | 33/DIG. 4 |
| 3,376,764 | 4/1968 | Schardt | 269/58 |
| 3,006,245 | 10/1961 | Bycer | 33/180 |
| 3,188,078 | 6/1965 | Paterson | 33/174 UX |

*Primary Examiner*—Joseph F. Peters, Jr.
*Assistant Examiner*—Michael Harris
*Attorney*—Curt M. Avery, Herbert L. Lerner et al.

[57] ABSTRACT

A device for producing a photo-varnish mask with a plurality of equal, mutually displaced structures, where a photo-varnish layer, attached to a plate or disc-shaped carrier, is gradually locally illuminated by projection at individual discrete places, for the purpose of producing one structure, and following all illuminating processes is developed and processed into a photo-varnish mask. A table provided with a defined attachment for the carrier of the photo-varnish layer is mechanically coupled with a second table and displaceable upon the latter in two coordinate directions. Mechanical gears are provided to adjust the position of the second table with respect to the stationary surrounding or reference plane. A gearless fine adjustment is provided between the first table and the second table which works continuously to adjust the position of the first table with respect to the second table. A mark, which is stationary at least with respect to both tables, is provided to aid in adjusting the exact position of the first table in the horizontal plane, by optical interferences, and particularly laser interferences.

8 Claims, 7 Drawing Figures

DEVICE FOR PRODUCING A PHOTO-VARNISH MASK

This is a streamlined continuation of application Ser. No. 769,856, filed Oct. 23, 1968, now abandoned.

To obtain defined conditions in the simultaneous production of a plurality of semiconductor components from a single semiconductor disc, there is a need for photo-varnish masks which have a plurality of equal structures arranged in two coordinate directions. It is in the interest of accuracy in the production of those photo-varnish masks to start with an original corresponding to the desired structure, and to project said original upon the photosensitive photo-varnish layer in a reduced size. In order to be able to produce simultaneously a plurality of structures from a single prototype, one can resort to a "fly-eye lens" described in U.S. Pat. application Ser. No. 693,613. However, such optic means which produce a simultaneous reproduction of a single original entail considerable optical intricacies in order to deliver really perfect pictures, free of distortions and of equal quality. Therefore, to reduce the technical expenditure, it is recommended to effect the single illumination which is required in the production of a plurality of structures, not at one time but in a sequence, and to use to this end, a projection device. The projection device may be of simple design which does not take advantage of the control possibilities. This requires the use of a device which helps to adjust the positions of the photo-varnish layers to be illuminated, which are used for individual illuminations, with great accuracy and in the shortest possible time.

It is an object of the present invention to provide such a device.

The present invention relates to a device for producing a photo-varnish mask having a plurality of equal, mutually displaced structures whereby a photo-varnish layer, affixed to a plate or disc-shaped carrier, is locally illuminated at individual, discrete places. Following overall illumination, the layer is developed to produce a photo-varnish mask.

The invention will further be described with respect to the drawing, wherein

Figure 1:
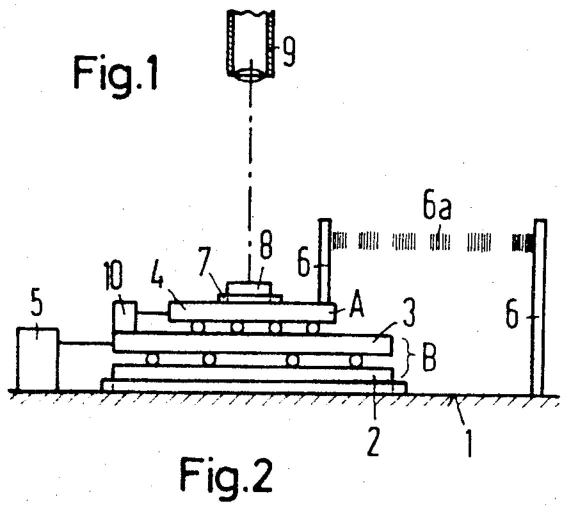
FIG. 1 shows the principle of the invention in a particularly simple case.

In the device of the present invention, a first table, table A (FIG. 1), provided with a defined attachment for the carrier of the photo-varnish layer is mechanically coupled with a second table, table B, and can be displaced relative to the latter in the horizontal plane in two coordinate directions. Also provided are mechanical gears to adjust the position of table B with respect to the stationary surrounding; a gearless fine adjustment, which is continually effective between table A and table B, to adjust the position of table A with respect to table B; and a marker which is stationary relative to both tables to control the exact position of table A in the horizontal plane by use of optical interferences, particularly laser interferences.

The fine precision adjustment of the position of table A relative to table B may be effected through a mechanism which undergoes a thermal expansion or contraction through the influence of a field. A simple example is the thermal expansion or contraction of an adjusting body influenced by impressed temperature differences (temperature field), whose expansion state directly determines the mutual position of both tables A and B. A further possibility is afforded by the use of magnetic and electric fields for an electrostrictive adjusting body which determines the position of table A on table B. Piezoelectric adjusting mechanisms which are affected by defined, electrical fields may be successfully used in accordance with the present invention. A further possibility is the pneumatic adjustment which is also possible without the use of a gear.

Optical control by means of interferences is known per se and can only be approximately described in the following case, by using an example.

Due to the increasingly fine geometries of semiconductor devices, particularly in solid state circuits, the demands placed upon the photo-varnish masks which aid in the production of such elements fully exhaust the limits of today's measuring and apparatus technology. As a result thereof, the manipulations associated with the production of said semiconductor devices can be carried out only under a microscope. This necessitates a device which as far as possible can dispense with the continuous control by means of microscopic observation. The same applies also to the manufacture of a photo-varnish mask.

In accordance with a constantly observed principle of measuring technology, at least the illumination optic is stationary in the horizontal line in the aforementioned device, while the semiconductor disc provided with the photo-varnish layer to be illuminated, is displaceable in the horizontal plane along two coordinate directions perpendicular to each other. This frequently requires a positioning accuracy, for example of $\pm 0.2\ \mu m$. Most of all tipping errors around an axis, in the projection direction, must be avoided. These errors would result in adjustment errors of the first magnitude. Furthermore, one should go as quickly as possible from one illuminating position of the photo-varnish layer to the next and then achieve the highest possible adjusting accuracy. All this is possible by means of the present invention.

The invention will be disclosed in greater detail with several embodiments making reference to the drawing.

FIG. 1 shows the principle of the invention in a particularly simple case. Stator 2 of a cross table B is attached to a stationary reference plane 1. Table A is mounted on the sliding carriage 3 of cross table B. These tables are called cross tables because they are movable in the horizontal plane on the stator in two coordinate directions. The stator of table A is tightly connected with the sliding carriage 3 of the cross table B, or as shown in FIG. 1, is identical with the sliding carriage of the cross table B. At any rate, such joining results in the carriage 4 of cross table A being displaceable in two coordinate directions in the horizontal, with respect to carriage 3 of cross table B, and being included in each movement of the carriage of cross table B.

At least one mechanical gear is provided to start the carriage 3, i.e., to effect a rough adjustment, making it possible to adjust all positions which are feasible within the adjustment range of cross table B. By the term "gear" we mean a mechanism wherein a solid body moved within a guide effects, because of mechanical compulsive forces, a forced movement of a second solid body which is also movable within a guide or a holder. Such gears are, for example, the gear drives, worm drives, spindles and similar equipment. It is preferred that the adjustment of the cross table B is effected in any desired operational position, by means of known automatic devices, such as mechanical rasters. In the drawing these known devices are indicated by a box 5 (not specified in any detail).

While the gear 5 coarsely adjusts the working position of the carriage 4 of the cross table A, the main object of the present invention is to correct the inaccuracies which occur as a result of mechanical inexactness, wear, etc. To this end, the carriage 4 of the cross table A may be moved along the carriage of cross table B in the horizontal line in two coordinate directions, whereby the control is effected with respect to the stationary surrounding and not with respect to the carriage 3 of cross table B.

Thus, the carriage 4 and the reference plane 1 are each connected to one solid marker 6. The distance between the two markers 6 is used for an optical control of the position of table A, in one coordinate direction. The control takes place in a known manner with optical or laser interferences 6*a*. The carriage 4 of the cross table A is provided with a holder 7 for receiving the workpiece coated with the photo-varnish layer 17, e.g., a semiconductor crystal 8, in a defined position. The illuminating device is indicated by 9. It is so arranged that its optical axis at the outlet lens falls on the displacement region of workpiece 8.

The region of displacement of carriage 4, upon carriage 3, is preferably very narrow. As previously mentioned, the main purpose is to compensate for slight inaccuracies in the shortest possible period. For this purpose, the invention provides the fine adjustments which are effective between the carriages 3 and 4 to adjust the position of carriage 4 with reference to carriage 3, with great accuracy and continuously.

It should be noted that in case of mobility in two coordinate directions, it is recommendable that means 5 for rough adjustment are provided at least in pairs as well as means 10 for precision adjustment. This is to ensure equal and high accuracy in the adjustment of carriage 4 and also of workpiece 8, with respect to the projection device 9, in two coordinate directions. The same applies for the marker 6 which serves for optical control.

Figure 2:
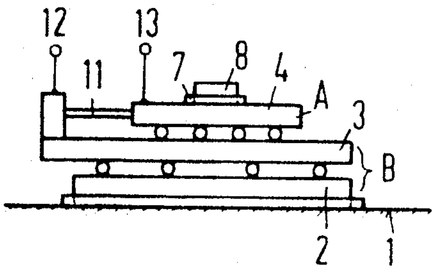
FIG. 2 shows an example of adjustment by defined temperatures.
Figure 3:
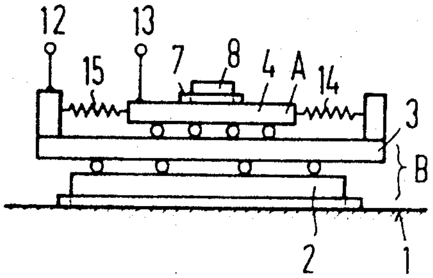
FIG. 3 shows an example of adjustment by the coaction of two differently acting adjusting mechanisms.
Figure 4:
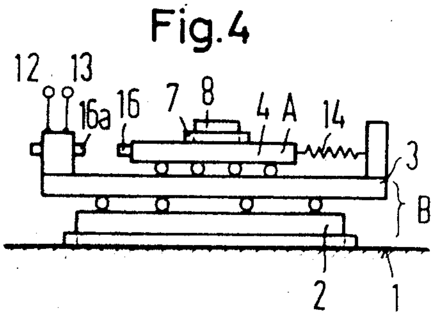
FIG. 4 shows another example of adjustment by the coaction of two differently acting adjusting mechanisms.

FIGS. 2 to 4 show preferred embodiment examples for precision adjustments 10. Rod or plate-shaped adjustment mechanisms 11 are provided in FIG. 2 between the carriage 3 of the cross table A and the carriage 4 of cross table B, which is movable by known mechanisms upon carriage 3, in the horizontal plane. Each of these adjustment mechanisms is connected by one end to the carriage 3 and with the other end rigidly connected with carriage 4. When the length of these adjusting mechanisms is altered, it effects a displacement of table A on table B proportional to the change in length. These changes in length may be produced in different ways, such as e.g., through the influence of a defined temperature field, an electrical or electromagnetic field, for example a magnetic field.

The simplest example of an adjustment by means of defined temperatures is shown in FIG. 2. In this instance, the adjusting mechanism 11 is electrically conductive and may be heated in a defined manner, by means of current connections 12, 13. Alternatively, the adjusting mechanism may be of electrostrictive or magnetostrictive material and its length determined through defined, adjustable electric or magnetic fields. Instead of expansion through heating, a contraction through cooling may be effected. If necessary, a heat insulation may be provided for the adjusting mechanism to make adjustment easier. All these adjusting mechanisms have in common that their lengths may be varied continuously within a narrow range. This permits a continuous mutual displacement of tables A and B, at a high accuracy, since said adjusting mechanisms do not wear down.

There is also a possibility of obtaining the desired displacement through the coaction of two differently acting adjusting mechanisms. An example is shown in FIG. 3. The carriage of table A is held in balance, for the purpose of fixing its position, by two pairs of springs which act in opposition. Preferably, said springs have a very high elasticity module (which means a small spring constant), in order to obtain a very steep change by means of the temperature difference of the two respectively opposed springs. One spring of said pair, in the example spring 14, is maintained at normal temperature while the other spring, in the example spring 15, may be heated by electrical current. Since the elastic constants depend on the temperature, the unheated spring will pull table A more toward it, the more the other spring is heated. After being returned to the original temperature, the old position is again readjusted exactly. It is possible to replace the reference springs with a reference force, for example through a weight pull.

Another possibility is to replace the spring, which in the device of FIG. 3 acts as an adjusting mechanism, by a magnetic field. In this case, the carriage of table A will be equipped with the carrier 16 of a permanent magnetic field to which a second such carrier 16*a* is oppositely so arranged that the field of the second magnetic field carrier exerts a moment of attraction or repulsion against table A which determines, in equilibrium with a spring, the respective position of the table A on table B. Moreover, the field direction is so adjusted to the mobility of table A upon table B, that a change in the field of the second magnetic field carrier 16*a* results in a displacement of the balance position of table A on table B. In this case, the second magnetic field carrier, e.g., a current passed magnetic field coil, replaces the adjusting mechanism. The second magnetic field carrier may be stationarily arranged on table 3, as well as on table 4. This instance is shown in FIG. 4 wherein the reference numerals are partly taken over from FIG. 3. The magnetic field carriers are indicated as 16 and 16*a*. They are being excited, for example, by an electrical direct current via terminals 12, 13.

Taking the place of a magnetic field carrier for effecting the adjustment of the position of table A on table B, may be the field of an air current which escapes from a nozzle and whose magnitude may be controlled. This air current impinges upon a sail which is tightly connected with table A, and in this manner exerts a force upon the table which depends on the velocity of the air current escaping from the nozzle. The opposing force, required to adjust the respective equilibrium position, is effected again by means of a spring, in the simplest case.

The use of combined cross tables for realizing the present invention constitutes a particularly favorable measure. But there are other possibilities for arranging table A upon table B. This applies in particular to the design of the guides which are required for the movement of table A on table B. For example, the upper side of table B may be designed as a tub, which is filled with a liquid, such as oil, on whose reflecting surface the table A floats. The control mechanisms may also be widely used in the aforedescribed manner for such an arrangement.

Figure 6:
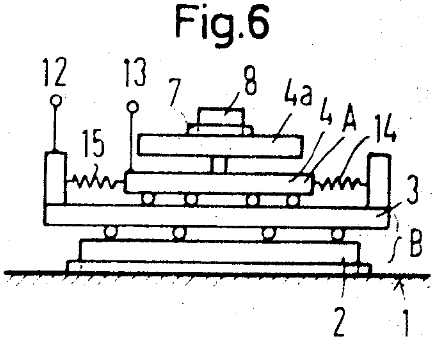
FIG. 6 shows a distortion-free arrangement for adjusting the position of the upper table.

It is clear that the aforedescribed possibilities for controlling the position in two perpendicular coordinate directions may also be utilized for a defined adjustment of the position of the upper portion of such a table A, against distortions (FIG. 6). The main thing is to produce a force which in itself exerts a non-disappearing torque upon the upper portion of table A which cannot be fully absorbed by the reactions of the holders of the upper portion of the table. Here, too, a combination torque may be successfully achieved by a spring force, such as shown in FIG. 2 to effect a linear displacement.

The physical processes which influence the position of table A with respect to table B are carried out independently of the adjustment of the position of table B. Preferably, the adjustment of the position of table B is effected in accordance with some predetermined program, in a fully automatic manner. If necessary, at least a control for the rough adjustment may be obtained by optical means, for example by interferences. Thus, for example, by a controlled spindle one can observe the interference maximum of a coherent, monochromatic light source, particularly a laser, which is produced and which occurs in a known manner. The interferences are thereby controlled between the marks of the reference plane 1 and the corresponding marks of the table. After the respective standstill of the rough adjustment one can examine, by electronic means, whether the desired position of the table A (the predetermined number of interference passages) has been achieved. If not, a control mechanism sets in which drives the table A by one of the aforedescribed precise fine adjustments into the exact position desired. As previously shown, the adjustment range of the precision adjustment is usually very small, i.e., within a range of a few $\mu$ or, at the most, millimeters. On the other hand, the described adjustment means are highly sensitive and may be continually regulated without difficulties and virtually at any desired exactness.

Figure 5:
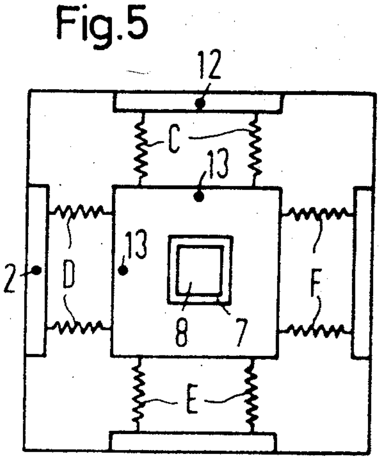
FIG. 5 shows a plan view of FIG. 3.

For further clarification, FIG. 5 shows in plan view the arrangement illustrated in FIG. 3. The sled 3 of table B which serves as a support for table A is equipped with ledges which hold table A with a pair of equally dimensioned springs in the position shown in FIG. 3. Any two adjacent pairs, e.g., C and D, may be heated through electrical current while the pair of springs E and F is kept at normal temperature. One recognizes immediately in this case that table A can easily float on a liquid present on table B or on a layer of a gas, without disturbing the functioning capacity of the device.

As previously indicated, it is often preferable if the table A is not only displaceable in two horizontal coordinate directions which are perpendicular relative to each other, but if table A has the ability for a defined rotation around a vertical reference axis. In the latter instance, it is expedient if the carriage of the table A also consists of two parts, of which the one on table B can be moved in two coordinate directions and may be controlled by a fine adjustment of the aforedisclosed type. The other, upper portion of table A carries the photo-varnish layer to be illuminated and is rotatable on table A by means of a vertical axis. The arrangement of both portions of the thus constructed table A can be seen from FIG. 6. One recognizes from the drawing how said portion of table A is maintained in the aforedescribed manner in a controllable balancing position upon table B and that its upper side carries the upper part which can be rotated around the axis and which serves as holder for the workpiece.

Figure 7:
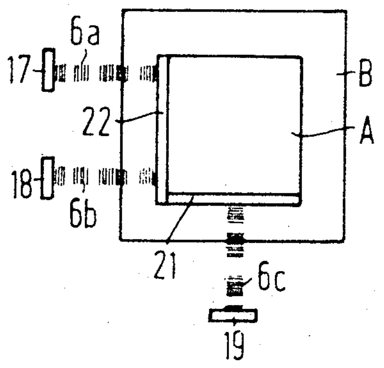
FIG. 7 shows the measuring paths necessary to establish the position of the upper table.

Thus, in summary, the following may be said:

To establish the position of the small cross table A, three independent measuring paths, 6a, 6b and 6c as seen in FIG. 7, are needed in one plane, if any possible distortion of the table is also to be measured and corrected. Thus, 17, 18 and 19 are bench marks with respect to the projection axis, while 20 and 21 are very planar, reflecting surfaces, perpendicular to each other. The planeness deviation is smaller than the permissible positioning error, for example 20.25 $\mu$. When the large cross table B is displaced, for example by means of a controlled spindle, the interference maximums and interference minimums occurring at the three measuring paths are counted. The optical and electronic devices used for this purpose are known. After the cross table B is at a standstill one examines, e.g., by electrical means, whether the desired position (the given number of interference passages) is obtained in all three measuring paths. Normally this will not be the case. A control mechanism then sets in which displaces the small table B, with the aid of one or several fine gears, until the desired position is reached. Since usually only slight displacements of the carriage of the small cross table A, with respect to the carriage of the large cross table B, are necessary to effect this, the present invention does not employ the conventional driving mechanisms but effects control by means of expansions or contractions of control mechanisms which occur by some physical processes. For example, the position of the carriage of the small cross table A can be adjusted by use of the expansion or contraction of magneto- or electrostrictive bodies, the expansion of heater substances or the motion of bimetallic strips. These possibilities afford very fast working control mechanisms which permit correcting the position of the small cross table A in less than one second.

A simple process is to establish the position of the small cross table A with the aid of springs and tensed wires. These wires may be heated relatively fast by the passage of current. They expand thereby and effect a displacement of the carriage of the small table A. A control circuit is built up for each of the three measuring paths which, by their coaction, place the carriage of the small table A into the desired working position where it is held fast. Since it is preferred to provide the carriage of the small table A with small moments of inertia, particularly with a small mass, the fine displacement may be carried out within a short period. When the cross table A and the work piece fastened thereto in a defined position, e.g., by means of fixings (dogs), are in the right position, the tool, e.g., the illuminating apparatus, may be automatically switched on. In the latter instance, it will be expedient to measure the amount of light emitted by the light source and to automatically interrupt the illumination when the amount of light needed for illumination has been obtained, whereupon the transport mechanism needed for the next operational step is initiated. In this way, an adequately uniform illumination is obtained even when the intensity of the light source fluctuates. When it becomes possible to increase the photosensitivity of the commercial photo varnishes, respectively the intensity of the available light sources, for example by lasers, to such a degree that illuminating periods of less than 1 millisecond will be sufficient, the illumination may be effected by flashes. But even then a separate control of the position of the photo-varnish layer to be illuminated is desirable. To this end, said photo-varnish layer and the carriage of one cross table are constantly moved in a coordinate, by a slowly driven spindle, for example at a speed of 0.5 to 1 mm/sec, whereby the passing interference strips are also counted, and upon reaching a specific number of passing interference strips, a flash is fired each time or an illumination with a fast shutter is effected.

Optical interferences as used in the claims include laser interferences.

I claim:

1. A device for producing a photo-varnish mask with a plurality of equal, mutually displaced structures, where a photo-varnish layer, attached to a plate or disc-shaped carrier, is gradually locally illuminated by projection at individual discrete places, for the purpose of producing one structure, and following all illuminating processes, is developed and processed into a photo-varnish mask, which comprises a first table provided with a defined attachment for the carrier of the photo-varnish layer, a second table, said first table being mechanically coupled with the second table and displaceable upon the latter in two coordinate directions with respect to a stationary reference plane, mechanical gear means to adjust the position of the second table with respect to the stationary reference plane, fine adjustment means to adjust the position of the first table with respect to the second table, said fine adjustment means provided between the first and second tables being suitable for continuous operation, means for a controllable expansion or contraction of the fine adjustment means in response to the effect of a temperature change upon said adjustment means to determine the position of the two tables relative to each other, and a marker which is stationary at least to both tables being provided to aid the exact positioning of the first table in the horizontal plane, by optical interferences.

2. The device of claim 7, wherein the position of the first table A on the second table B is controlled with the aid of a fixed adjustment body whose one end is tightly connected with the first table and the other end with the second table, and whose length is determined by an electric current which flows through the adjusting body, or by an electrical or magnetic field which penetrates the adjusting body, and means for changing the intensity of the indicated current or of the electric or magnetic field.

3. The device of claim 2, wherein the adjustment means is produced of electromagnetic-responsive material and its length may be regulated through the action of an apparatus portion which produces an electromagnetic field.

4. The device of claim 1 wherein the entire adjustment range in any direction of the second table with respect to the first table is less than 1 mm.

5. The device of claim 1, wherein the rough adjustment which determines the position of the second table and the fine adjustment which determines the position of the first table with respect to the second table may be automatically controlled.

6. A device for producing a photo-varnish mask with a plurality of equal, mutually displaced structures, where a photo-varnish layer, attached to a plate or disc-shaped carrier, is gradually locally illuminated by projection at individual discrete places, for the purpose of producing one structure, and following all illuminating processes, is developed and processed into a photo-varnish mask, which comprises a first table provided with a defined attachment for the carrier of the photo-varnish layer, a second table, said first table being mechanically coupled with the second table and displaceable upon the latter in two coordinate directions with respect to a stationary reference plane, mechanical gear means to adjust the position of the second table with respect to the stationary reference plane, fine adjustment means to adjust the position of the first table with respect to the second table, said fine adjustment means provided between the first and second tables being suitable for continuous operation, means for a controllable expansion or contraction of the fine adjustment means in response to the effect of an electromagnetic force upon said adjustment means to determine the position of the two tables relative to each other, and a marker which is stationary at least to both tables being provided to aid the exact positioning of the first table in the horizontal plane, by optical interferences.

7. The device of claim 6, wherein the entire adjustment range in any direction of the second table with respect to the first table is less than 1 mm.

8. The device of claim 6, wherein the rough adjustment which determines the position of the second table and the fine adjustment which determines the position of the first table with respect to the second table may be automatically controlled.

* * * * *